June 4, 1968 E. J. PASTERNAK 3,387,278

DATA PROCESSOR WITH SIMULTANEOUS TESTING AND INDEXING ON CONDITIONAL TRANSFER OPERATIONS

Filed Oct. 20, 1965 4 Sheets-Sheet 1

INVENTOR
E. J. PASTERNAK
BY
Charles Scott Phelan
ATTORNEY

United States Patent Office 3,387,278

Patented June 4, 1968

3,387,278

DATA PROCESSOR WITH SIMULTANEOUS TESTING AND INDEXING ON CONDITIONAL TRANSFER OPERATIONS

Edward J. Pasternak, East Orange, N.J., assignor to Bell Telephone Laboratories, Incorporated, New York, N.Y., a corporation of New York Filed Oct. 20, 1965, Ser. No. 498,787
7 Claims. (Cl. 340—172.5)

ABSTRACT OF THE DISCLOSURE

A data processor conditional transfer instruction specifies first and second ones of a plurality of registers having contents that are used simultaneously for testing for an instruction-specified condition and indexing an instruction-specified transfer address. If the condition sought is realized, the indexed address is employed immediately to access the processor memory.

This invention relates to a programmed data processing system and particularly it relates to improved arrangements therein for executing decision functions for determining the course of program steps.

Certain data processing systems include a memory and a processor associated therewith. The memory is adapted to store data for processing and to store a program of instructions for controlling the processor in its operations upon data. In addition, provision is generally made for receiving additional data for processing from external sources. One data processing system of this type is shown in the copending application of A. W. Kettley, W. B. McCurdy, D. Muir III and U. K. Stagg, Jr., filed Dec. 30, 1964, Ser. No. 422,313 and entitled, "Data Processor Control Utilizing Tandem Signal Operations." Programs for systems of the type mentioned frequently include conditional transfer instructions which cause the processor to test certain specified information against a criterion indicated in the instruction and to decide the character of specified data with respect to such criterion. If the criterion, or condition, is not satisfied the processor is caused to take the next succeeding instruction in the program listing. However, if the information meets the specified condition in the instruction, the processor is caused to transfer, or jump, to a program instruction which often is not the next succeeding instruction in the listing following a conditional transfer instruction. The address in memory of the new nonsequential instruction is specified in the transfer instruction and is called a "transfer address."

Frequently the transfer address must also be indexed by certain data in order to modify the address to meet certain program conditions. In some prior art processors separate special purpose circuits are dedicated for performing the indexing and the testing functions separately. In other prior art circuits, such as that shown in the mentioned Kettley et al. application, the processor utilizes common general purpose circuits consecutively for performing the indexing and testing operations as well as for performing other general purpose processing functions. The former approach requires a relatively large amount of hardware and therefore increases both the cost and the probability of failure within the processor. On the other hand, the latter approach requires an expenditure of time to perform indexing and testing operations consecutively during the execution of a transfer instruction. Also in the Kettley et al. processing system it is necessary to register the test data immediately prior to a transfer instruction and then await execution of such instruction. A certain amount of extra hardware is required for such data registration.

It is, therefore, one object of the present invention to improve the operation of data processing systems.

It is a further object of the present invention to reduce both the time and the circuitry required for carrying out conditional transfer functions in data processing systems.

These and other objects of the invention are realized in an illustrative embodiment of a data processing system in which decision logic for use in conditional transfer testing is coupled to the outputs of a combinational shift or rotate circuit which receives test information from the output of any one of plural general purpose registration means of the processor. The decision logic circuits and the cooperating shift or rotate circuits are arranged to utilize different information coupling paths than those which are employed for indexing a transfer address so that the transfer decision testing and the transfer address indexing may be simultaneously carried out. However, both sets of information coupling paths and the associated indexing circuits and shift or rotate circuits are utilized in cooperation with one another during the execution of other types of program instructions not requiring both of the conditional transfer testing and indexing functions.

It is one feature of the invention that the utilization of separate information coupling paths for decision testing and for indexing permits the simultaneous performance of both functions in order to save processor time while the cooperative use of these same paths in other processor functions permits a significant reduction in the amount of circuit hardware that is required for the processor.

It is another feature that the performance of the testing function on the outputs of the plural registration means permits the contents of any of the plural registers to be tested conveniently at the desired time in the program without the necessity for the registration of a particular item of test information in a specially dedicated register to await the moment when it must be used.

A further feature is that the use of a combinational shift circuit in combination with decision test circuits makes it possible to test any selected bit of a data word without providing multiple bit-test circuits and without taking additional processor operating phases to shift a desired bit into a predetermined test position before testing.

Still another feature of the invention is that the cooperative utilization of a combinational shift circuit and decision test circuits permits the test results to be produced during instruction execution so that it is not necessary to register such results separately prior to utilization thereof.

A more complete understanding of the invention and the various features, objects and advantages thereof may be obtained from the following detailed description when considered in connection with the appended claims and the attached drawings in which:

Figure 1:
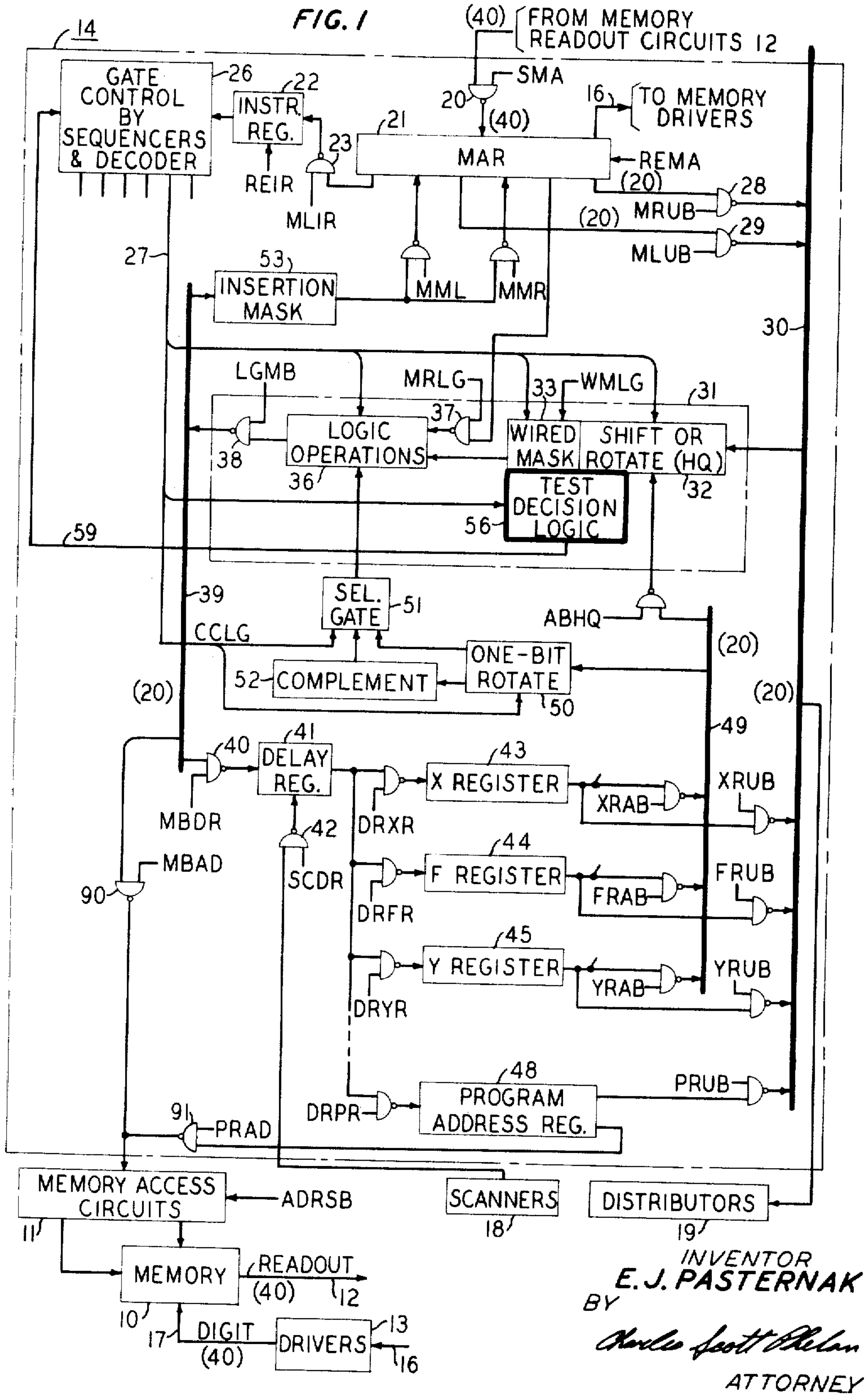
FIG. 1 is a simplified block and line diagram of a data processing system utilizing the invention.

The data processing system illustrated in FIG. 1 is similar in many respects to the system disclosed and claimed in the aforementioned Kettley et al. application. Accordingly, its over-all operation will be described here in only enough detail to permit an understanding of the operation, features, and advantages of the improvement of the present invention.

A memory 10 is provided for storing data and program instructions for a processor 14. The memory can be any type known in the art. Memory access circuits 11 control the writing in and reading out of information at particular word addresses of the memory 10 as is well known in the art. Read-out from the memory is obtained on sensing circuits 12 which are schematically indicated by a single line representing a plurality of such circuits with one being provided for each bit of a data or program word which is coupled out of the memory 10. In one embodiment 40 such circuits are provided for information to be considered herein as schematically indicated by the number 40 in parentheses adjacent to the cabled circuits 12 in FIG. 1. Driver circuits 13 receive information on circuits 16 from the processor for controlling the bit, or digit, signals on circuits 17 to cause corresponding information to be written into the memory 10. The remaining circuits illustrated in FIG. 1 comprise the processor 14 which receives input data from external sources by way of scanner circuits 18 and which provides data to external circuits by way of distributor circuits 19.

Figure 2:
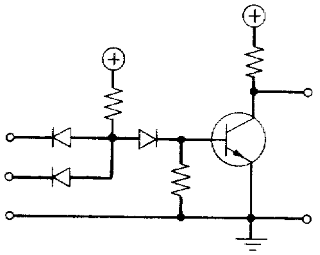
FIGS. 2 and 3 are diagrams of details of circuits shown by simplified schematic notation in other figures.

In the processor of FIG. 1 a gate 20 receives the read-out signals from the sensing circuits 12 of the memory 10 and applies such signals to a memory access register 21 during a time which is represented by a gating signal SMA that is also applied to an input of the gate 20. The signals on circuits 12 may comprise either a 40-bit data word or a 40-bit program instruction word. The gate 20 is a conventional NAND logic gate of the type illustrated in FIG. 2 which has one, two, or more input connections and which is adapted so that the coincidence of high voltage signals at all of its input connections that are not connected to ground as shown in FIG. 2 causes the circuit to produce a low voltage or ground at its single output connection. However, if at least one of those input connections is at a low voltage, e.g., ground, input level, the gate produces at its output a high voltage condition. Such gates usually comprise an input stage of AND logic followed by an output inverting stage such as a common emitter transistor amplifier as illustrated in FIG. 2. Such amplifier may have an individual operating potential source and collector load resistor for developing an output signal, or it may share such source and load resistance with a plurality of other amplifier circuits in different gates or other types of circuits. This type of load-such bistable circuit may comprise, for example, a pair the schematic gate representation of the type shown for the gate 20 in FIG. 1.

Figure 3:
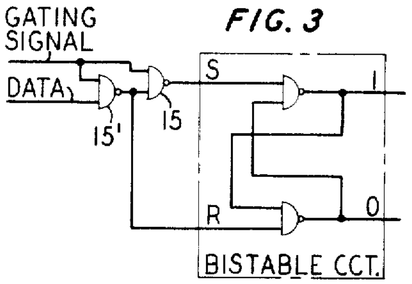

The register 21 is simply an array of bistable circuits which are arranged to receive input signals in parallel and to provide parallel output signals in like manner. Each such bistable circuit may comprise, for example, a pair of cross-coupled NAND gates as is well known in the art and shown in FIG. 3. Single-rail input connections are also shown in FIG. 3 but are not used with the bistable circuits of register 21. Information signals are supplied on a single-rail logic basis to the set input of the bistable circuit following a common reset signal REMA which is provided for clearing the register prior to the entry of new information therein. The instruction register 22 is similarly arranged, and the REIR signal provides a common reset to that register.

However, in all of the other registers to be hereinafter mentioned in FIG. 1, each of the bistable circuits advantageously includes single-rail input connections shown in FIG. 3 and including a gate 15 in the set input lead so that the bistable circuit can be operated on a single-rail logic basis. Thus, each data input signal change causes a change of state in the bistable circuit so that no common reset is required. An additional gate 15' is included in the single-rail connections to permit the clocking of information into the register under the control of a gating signal. Such gating signal is also applied to gate 15 to permit the bistable circuit to hold an information state registered therein until new information is supplied, all as is well known in the art. The clocking function of gates 15 and 15' in the single-rail connections is schematically represented by a single gate at each register input in the simplified circiut of FIG. 1. No facility is provided for shifting information transversely through the array of bistable circuits in any register.

Gating control signals, such as the aforementioned SMA signal, and register control signals, such as the aforementioned REMA and REIR signals, are produced by control circuits to be hereinafter mentioned. Such signals are designated by mnemonic reference characters which indicate the function of the signal. Thus, the SMA signal causes gating of information from the store, i.e., from memory 10, to the memory access register 21; and the REMA signal resets the memory access register.

Binary coded instruction signals are coupled from the left half of the memory access register 21 to the instruction register 22 by a gate 23 in response to the MLIR gating signal. Output from register 22 is applied to a control circuit 26 which includes a clock source, sequencers, and decoders cooperating in a manner well known in the art for developing output signals that are utilized throughout the processor for controlling the various gates and registers in proper sequence for the execution of instructions received from the register 22. The control circuit 26 in FIG. 1 produces the various gate control signals, but actual connections to the gates are not indicated because they would unnecessarily complicate the drawing. The aforementioned mnemonic reference characters are utilized instead to represent schematically the coupling between individual gates and the control circuit 26 and to indicate at the same time the type of operation being performed. These mnemonic reference characters are carried over to the timing diagrams of FIG. 7 which will be subsequently discussed. The control circuit 26 also provides output signals on different leads in a cable 27 for controlling various operation circuits of the processor in response to decoded program instructions.

The processor of FIG. 1 is advantageously adapted to process in bit-parallel fashion 20-bit word portions of the 40-bit words which appear from time to time in the memory access register 21. Accordingly, two gates 28 and 29 are provided for coupling the output from either the right half or the left half, respectively, of register 21 to an unmasked bus 30. The bus 30 couples the 20 parallel signals to the input of a tandem logic operations circuit 31. Within the circuit 31 a combinational shift or rotate circuit 32, which receives the signals from the bus 30, is of the combinational logic type shown in the copending application of D. Muir III, filed Dec. 23, 1964, Ser. No. 420,566, and entitled, "Shift and Rotate Circuit for a Data Processor." "Combinational logic" refers to circuits receiving plural inputs and producing an output which persists as long as a predetermined relationship among the various inputs is maintained.

Although the circuit 32 has the capability of selectably shifting or rotating data signals either left or right, through a selectable number of bit positions, only the right shift capability is necessary for an understanding of the present invention. Shift or rotate circuit 32 will, therefore, be hereinafter called simply a shift circuit. A wired mask circuit 33 cooperates with the shift circuit 32 and couples signals on to a logic operations circuit 36. The logic operations circuit 36 may also receive input signals directly from the memory access register 21 by means of a gate 37 that is controlled by the signal MRLG. An additional control signal WMLG is provided for the wired mask 33 and is the complement of the MRLG signal so that the logic operations circuit 36 may receive one argument signal by way of either gate 37 or mask 33 but not both of them. A gate 38 responds to the signal LGMB for coupling the output of circuit 36 to a masked bus 39. Signals on the masked bus 39 may be coupled in a variety of paths for different purposes. Thus gate 40 responds to a signal MBDR for coupling the mask bus 39 to the input of a delay register 41.

Register 41 can alternatively receive input signals, also on single-rail logic basis, from scanners 18 by way of a gate 42 which is responsive to the control signal SCDR. Output from the delay register 41 is advantageously selectively coupled to any one of a plurality of general purpose registers 43, 44, or 45. Such registers are not dedicated and may be used for accumulators, index registers, or any other processor function requiring temporary storage. More general purpose registers are advantageously provided, but only the three illustrated are necessary for an understanding of the present invention. These registers are designated the X, F, and Y registers, respectively; and they are selected by coupling through gates controlled by the signals DR$\phi$R wherein the "$\phi$" in this and other reference characters indicates any specified one of the operation registers X, F, or Y. The output of delay register 41 is also coupled to a program address register 48 in response to the control signal DRPR. The bit-parallel outputs of the registers 43, 44, and 45 may be selectively coupled to unmasked bus 30 in response to one of the gate control signals $\phi$RUB; and the output of register 48 also is coupled to bus 30 in response to signal PRUB.

The outputs of registers 43 through 45 may also be coupled to an argument bus 49 in response to one of the gate control signals $\phi$RAB in order to provide a second argument for the combinational logic of shift circuit 32 under the control of signal ABHQ or to provide a second argument for the combinational logic operations circuit 36. In the latter case, the signals are coupled from argument bus 49 through a one-bit rotate circuit 50 and a selection gate 51 that is controlled by the signal CCLG. Alternatively, the output of one-bit rotate circuit 50 may be coupled through a complementing circuit 52 to the gate 51. Details of the purposes and operations of the circuits 50, 51, and 52 are set forth in the aforementioned Kettley et al. application.

A 20-bit processor word can be selectively coupled through different paths. One such path extends from memory access register 21 through unmasked bus 30, tandem operations circuit 31, masked bus 39, and delay register 41 to at least one of the general purpose operation registers 43 through 45. Conversely, the output of any one of those registers can be coupled through the unmasked bus 30, tandem operations circuit 31, masked bus 39, and an insertion masking circuit 53 to either the left or the right half of memory access registers 21. Also the output of one of the operation registers 43 through 45, or the program address register 48, can be coupled by way of the unmasked bus 30, tandem operations circuit 31, masked bus 39, and delay register 41 back to the same register or to a different register. The contents of program address register 48 would be so coupled through the tandem operation circuit 31 in order to increment the program address in the logic operations circuit 36 by means of a wired-in increment signaling arrangement in the one-bit rotate circuit 50 as described in the Kettley et al. application. If information is coupled from one of the operation registers back to the memory access register 21, it can then be read from register 21 by means of the circuits 16 to control drivers 13 for writing into memory 10 as previously described. The address at which such writing takes place is selected from bus 39 by a gate 90 or from register 48 by a gate 91, and the access circuits 11 address memory 10 during a control signal ADRSB.

In accordance with the present invention, test decision logic circuits 56 are coupled to the shift circuit 32 for performing tests on information contained in any selected one of the general purpose registers 43 through 45. The tests determine the character of information in a register, and the test results are compared to a test condition specified in a program instruction which requires a conditional transfer operation. For example, such decision test logic can be employed for use in determining whether or not the content of a register is all ZEROS, or for determining whether or not a specified bit in a register is ZERO, or for determining the sign of data contained in a register. It can also be employed in conjunction with such well known processing operations as detecting the rightmost ZERO of a processor word or for zeroing the rightmost ONE of a processor word, but such operations are not herein described.

One of the principal advantages of locating test decision logic 56 in close association with the shift circuit 32 is that one processing word can be tested as directed by a transfer instruction at the same time that a different processor word is being utilized as an argument in logic operation circuit 36 for indexing the transfer address of the same instruction. This advantage is illustrated more clearly by a comparison of the partial diagrams of FIGS. 4 and 5.

Figure 4:
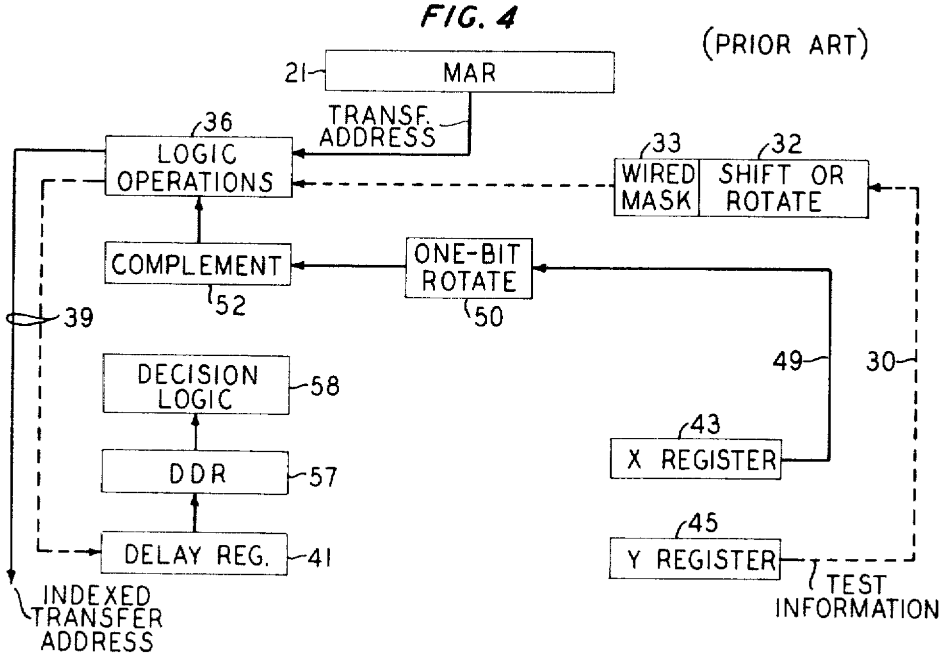
FIG. 4 (PRIOR ART)
FIGS. 4 and 5 are partial block and line diagrams of the processor of FIG. 1 and illustrating an advantage of the invention.

FIG. 4 is a partial diagram of a processor of the type shown in the Kettley et al. application and indicates in greatly simplified fashion the manner of processing a transfer instruction. In FIG. 4 it is necessary first to initiate a determination as to whether or not a transfer is to be accomplished; and for this purpose testing information from the Y register 45 is coupled through the unmasked bus 30, shift circuit 32, wired mask 33, logic 36, and masked bus 39 along the broken-line path indicated to the delay register 41. At that register an output is coupled to a data delay register 57 which holds the test information while the transfer address is being indexed. The output of register 57 is applied to decision logic 58 which then performs the desired test and provides an output indication to the control circuit 26. Separate bit test circuitry is provided for each bit output of register 57 to check any bit position specified by the decoder.

If a transfer is to be accomplished in FIG. 4 the transfer address must be indexed. The transfer address is supplied as a first argument directly to the logic operations circuit 36 where it is indexed by the contents of the X register 43 which are coupled to the circuit 36 by way of the argument bus 49, one-bit rotate circuit 50, and the complement circuit 52. The output of logic operation circuit 36 is coupled through masked bus 39 as the indexed transfer address to be coupled to memory access circuits 11. It is apparent that the arrangement of FIG. 4 requires utilization of both the logic circuit 36 and the masked bus 39 both for securing the test information and for indexing the transfer address. Accordingly, the testing and indexing must in that embodiment be sequentially performed.

Figure 5:
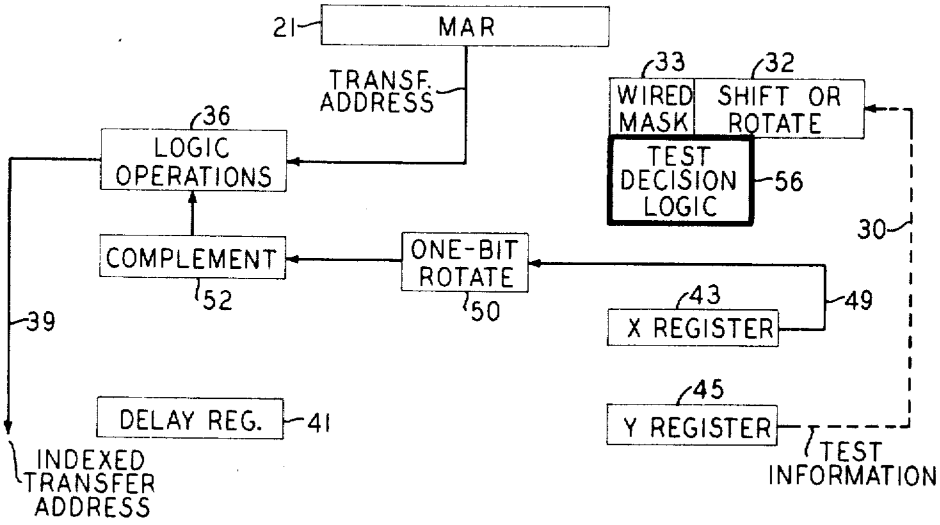

In FIG. 5, in accordance with the present invention, the decision logic is combined with the shift circuit 32. In this embodiment the transfer address is indexed as previously described. However, the test information is now tested simultaneously with the indexing operation because it is coupled through unmasked bus 30 and shift circuit 32 to the decision logic 56 where the test is performed. Then the output of that logic 56 is coupled to the control circuit 26, as previously indicated. The decision logic is arranged so that no masking is required for carrying out its functions and any shifting that is required is performed in the shift circuit 32. The data delay register 57 is completely eliminated since it is no longer necessary to register the test information in a separately dedicated register while awaiting completion of the indexing operation.

Furthermore, the arrangement of the present invention as illustrated in FIG. 5 is characterized by greater flexibility from the programmer's standpoint than is the arrangement of FIG. 4. The reason is that the decision logic 56 in FIG. 5 has immediate access to any of the general purpose registers for there is no longer a rigid programming requirement that test information be placed in a data delay register prior to calling for execution of a transfer instruction. Thus, for example, data resulting from a logic operation performed in some preceding program step could be placed directly in one of the general purpose registers to await the time when it is to be used. Then additional program instructions can be carried out, some of which may be unrelated conditional transfer instructions, prior to the execution of the conditional transfer instruction with which such data is associated. When the latter transfer instruction comes up for execution the data is available for testing during the indexing operation without the necessity for taking time first to transfer the data to a specialized register such as the register 57 in FIG. 4.

Figure 6:
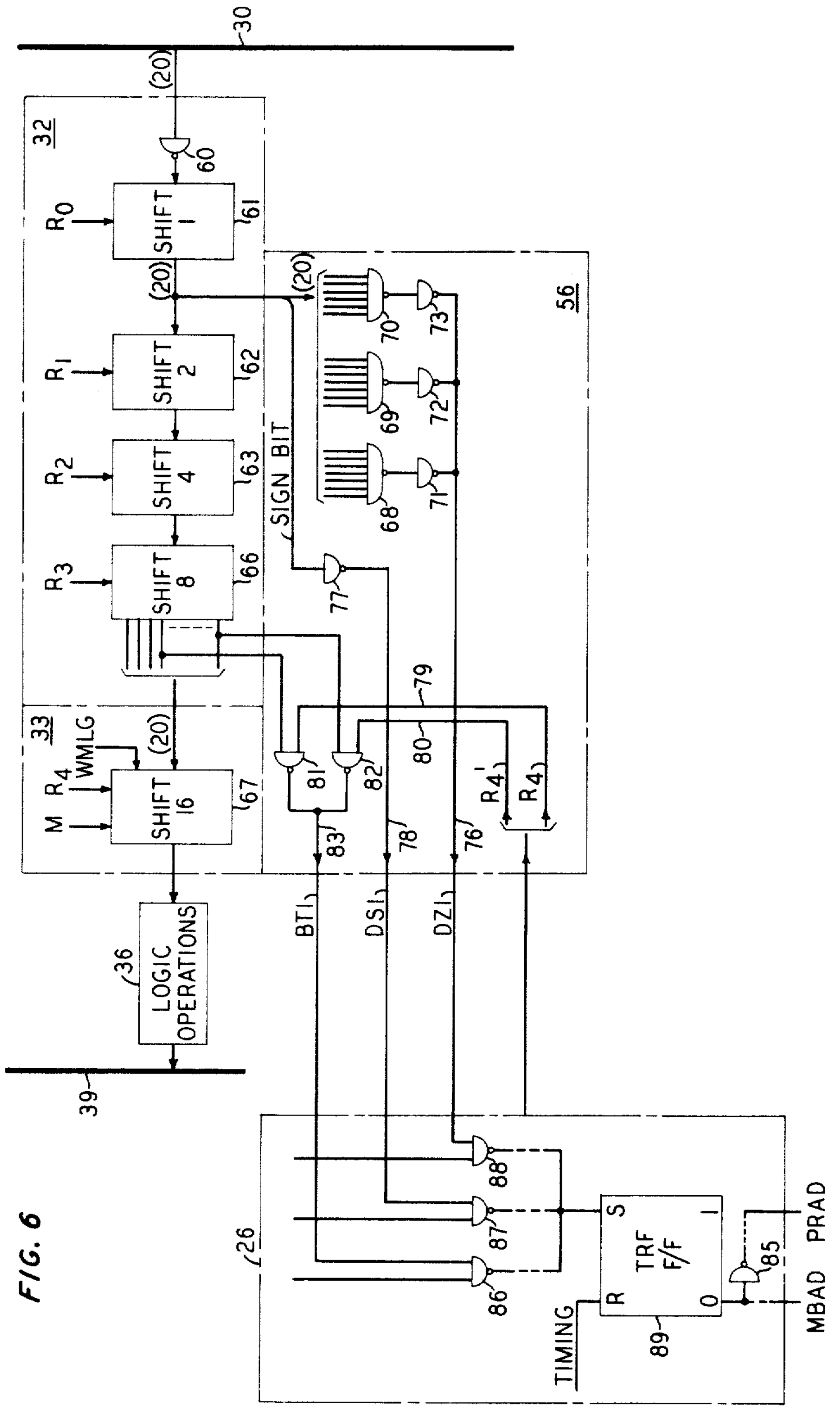
FIG. 6 is a partial block and line diagram illustrating in somewhat greater detail one form of connections that are advantageously used for carrying out the invention.

FIG. 6 shows in greater detail the circuit arrangements for coupling the decision logic to the shift circuit 32. Shift circuit 32 includes a stage of inverting gates 60 and five stages of shifting gates 61, 62, 63, 66, and 67, the last of which also includes the function of the wired mask circuit 33 as indicated by the control lead M which provides mask defining signals from gate control circuit 26. Each of the shifting stages accommodates a full processing word in bit-parallel fashion as described in the aforementioned Muir application and is adapted either to invert and shift the word by an indicated number of bits or to couple the word through to the next circuit with a simple polarity inversion. The shift circuit 61 accomplishes a one-bit shift under the control of a signal $R_0$ from gate control circuit 26. Similarly, circuits 62, 63, 66, and 67 accomplish shifts of 2, 4, 8, and 16 bits, respectively, under the control of signals $R_1$, $R_2$, $R_3$, and $R_4$, respectively. Any one of the shift stages may be used singly or in combination with one or more other shift stages to accomplish a total bit shift of from one to 19 bit positions as may be required. However, in the illustrated embodiment only shifts of up to 15 bit positions are accomplished for purposes of the decision logic circuits 56 since complement signal WMLG′ of the gating signal WMLG is present at the shift stage 67 to inhibit that stage in the absence of the WMLG signal. Gating signal WMLG′ thereby decouples the shift circuit 32 from the logic operations circuit 36 during transfer instructions, as outlined in connection with FIG. 1. Three different tests are accomplished in the decision test logic 56 which is illustrated in FIG. 6.

A first one of the tests determines whether or not the contents of a general purpose register are all ZEROS. For this purpose the 20-bit content of such register is coupled through the shift stage 61 with an inversion, but without shifting, to the 20 inputs of concidence gates 68, 69, and 70. The outputs of those three gates are coupled through three additional inverting gates 71, 72 and 73, respectively, to a common output circuit 76. If all 20 bits of the test word are in the ZERO condition, all of the inputs to the gates 68 through 70 are in the high voltage state so that those gates produce low voltage outputs which are inverted by the gates 71 and through 73 to a high voltage condition on the lead 76. This condition is designated a DZ1 signal, i.e., a high voltage indicating that an all ZERO condition has been detected. If any one of the bits were in a low voltage condition, the corresponding one of the gates 68 through 70 would be disabled so that its output would be high and the output of the corresponding one of the gates 71 through 73 would be low, thereby clamping the lead 76 at ground to indicate the absence of an all ZERO condition.

A second test performed by the illustrative embodiment of the decision logic 56 is a test to detect the sign of data in a general purpose register. For this purpose the full content of the register is coupled through unmasked bus 30, inverting stage 60, and shifting stage 61 without any shift. At the output of the shift stage 61 the sign bit output, which is coupled with other bits in a 20-bit cable to the gates 68 through 70, is also exclusively coupled by a single lead to an inverting gate 77 which supplies a DS1 signal on a lead 78. The DS1 signal is in the high voltage condition if the sign of the data is negative and a low voltage condition if the sign is positive.

The third test that can be performed by the circuits 56 of FIG. 4 is a test to determine the condition of a single bit of a processor word. For this purpose the selected bit is shifted by the shift circuit 32 to a predetermined bit position. The extent of such shift is controlled by the $R_0$, $R_1$, $R_2$, et cetera, signals that are produced by control circuit 26 upon decoding the specification in the transfer instruction of the bit to be tested. In carrying out this test two additional signal leads are also received from the control circuit 26 to supply the shift-16 signal $R_4$ and its complement $R_4'$ to test circuits 56. The $R_4$ signal is supplied on a lead 79 and the $R_4'$ signal is supplied on a lead 80 to indicate the absence of a 16-bit shift. These two signals are provided to gates 81 and 82, respectively, which have their outputs connected together to a common output lead 83. Such signals on leads 79 and 80 are employed, in the particular embodiment illustrated, in lieu of operation of shift stage 67 which is advantageously disabled by the WMLG′ signal during transfer operation testing, as hereinbefore mentioned.

If bit position ZERO is to be tested, the contents of the selected general purpose register are coupled through shift circuit 32 to the output of shift stage 66 with no shift being accomplished. Under these conditions the no-shift signal $R_4'$ on lead 80 enables the gate 82. The ZERO bit position output of stage 66 is also coupled to gate 82 so that the output on lead 83 is ground if the bit in that position is a ONE and high if it is a ZERO. Gate 81 is at that time disabled by the signal on lead 79 so that the gate output is high and is unable to clamp lead 83.

Similarly, if any of the bit positions 1 through 15 is to be tested the no-shift signal $R_4'$ on lead 80 enables gate 82 while gate 81 is disabled. Now, however, the output of the register being tested is shifted by an appropriate amount in the shift circuits 61, 62, 63, and 66 to place the desired bit in the bit ZERO position of the output of shift stage 66. Thus, if the bit in bit position 4 were to be tested, an $R_2$ signal would call for a 4-bit shift which activates only the shift stage 63 and places the desired bit in the bit ZERO position of the outputs of stages 63 and 66. Consequently, gate 82 is once more activated to produce the ground voltage condition on lead 83 if the bit is a ONE.

When a bit in bit position 16 of a general purpose register is to be tested, the shift-16 signal $R_4$ on lead 79 enables gate 81 while gate 82 is disabled. The output of the general purpose register under test is coupled through the shift circuit 32 to the output of shift stage 66 with no shift. The output of bit position 16 at the stage 66 is coupled to another input of the gate 81 for actuating that gate and clamping lead 83 to ground if the bit under test is a ONE. All outputs of stage 66 are also coupled to the input of the stage 67 as previously noted, of course; but stage 67 is disabled by signal WMLG′ at this time.

If any one of the bit positions 17 through 19 of a selected general purpose register is to be tested, the shift-16 signal $R_4$ on lead 79 again enables gate 81, but in this case either one or both of the shift stages 61 and 62 is activated by the signals $R_0$ and $R_1$ to shift the desired bit into bit position 16 so that the desired bit appears in position 16 in the output of stage 66 and is applied to the input of gate 81 for actuating that gate to clamp lead 83 to ground if such bit is in the binary ONE condition.

The BT1, DS1, and DZ1 signals are coupled on their respective leads to inputs of gates 86, 87, and 88, respectively, in control circuit 26. These gates and other logic gates, not shown, combine the three test signals with certain decoding and sequencing functions for comparing the test result signals with a transfer criterion specified in an instruction. The manner of combining such functions is well known in the art and provides the necessary control circuit 26 operation for selecting the next address for memory 10 in accordance with the character of the test data as indicated by the test logic output. The derivation of the decoding and sequencing functions is not a part of the present invention; and it is, therefore, schematically indicated in the control circuit 26 in FIG. 6 by the unconnected input leads to gates 86, 87, and 88 and by broken-line connections in other parts of the block representing circuit 26. An illustrative operating sequence that results from the decoding of a particular instruction will be discussed in connection with FIG. 7.

The outputs of the gates 86 through 88 are further combined with sequencing and decoding functions as schematically indicated by broken-line connections to the set input of a TRF flip-flop circuit 89. When the test signal results are so related to a test condition specified in an instruction that a transfer to a different program routine is required, a ground output from one of the gates 86 through 88 causes the flip-flop 89 to be set. The flip-flop 89 is a conventional bistable circuit of the type illustrated in FIG. 3. The setting of flip-flop 89 produces a gate actuating signal at the binary ZERO output of the flip-flop, and that signal is further combined with other sequencing and order decoding functions not shown but schematically indicated by a broken-line connection to an output lead MBAD. The MBAD gate control signal actuates a gate 90 in FIG. 1 to make the indexed transfer address from masked bus 39 available to the memory access circuits 11.

At a predetermined time after the setting of the flip-flop 89 a timing signal controlled by normal sequencing operations of the processor resets the flip-flop. In the normal reset state of the binary ZERO output flip-flop 89 is coupled, when directed by proper sequencing, schematically indicated by a gate 85 and a broken-line connection, to produce a PRAD output control signal. The latter signal actuates a gate 91 in FIG. 1 to make the output of program address register 48 available to the memory access circuits 11 in FIG. 1.

Thus, the gates 90 and 91 implement the decision as to whether or not a transfer should be accomplished, and they make the appropriate address signals available to memory 10 to provide either the next sequential program instruction or the indicated transfer routine instruction to the processor as directed. The decision as to whether or not to transfer is made and implemented by means of circuit paths and operation circuits which serve both the normal general purpose data processor operations, and the special transfer functions of simultaneously indexing a transfer address and testing data for use in deciding whether or not a transfer should be accomplished.

Figure 7:
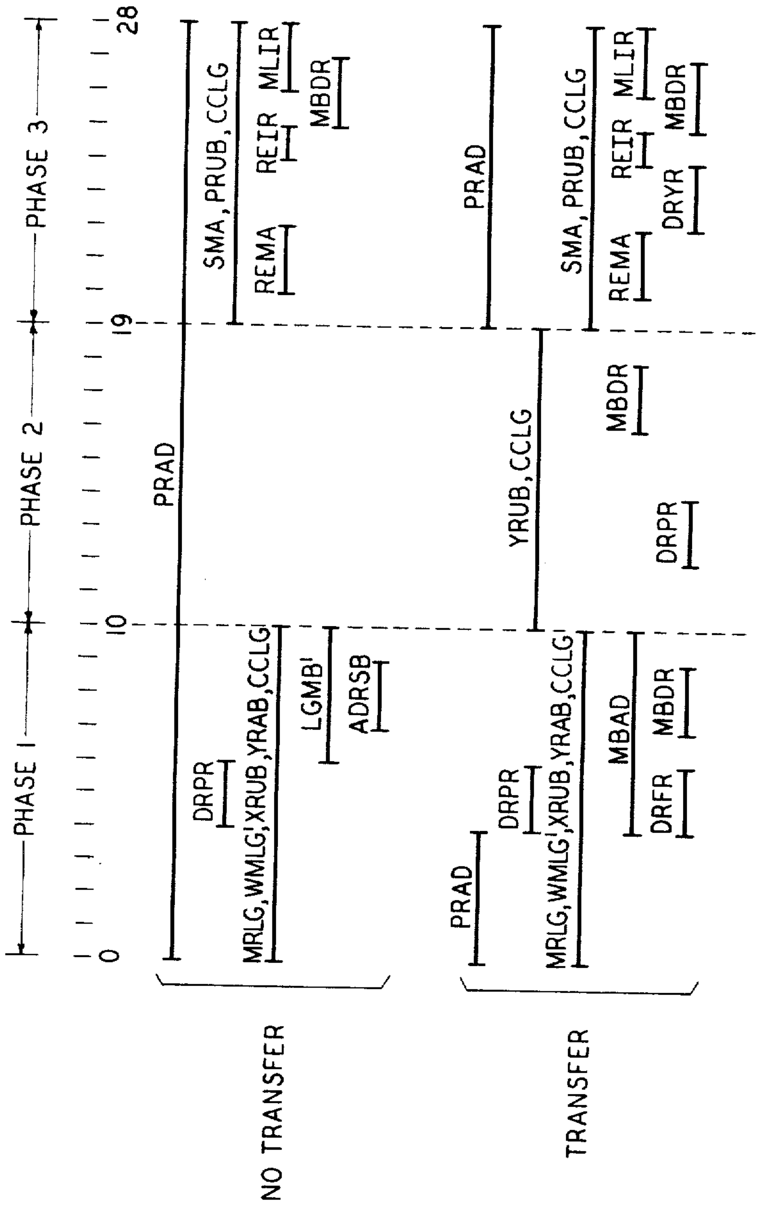
FIG. 7 is a timing diagram illustrating the operation of the processor of FIG. 1.

FIG. 7 is a timing diagram illustrating the principal control signals of interest here for a sequence of processor operations in accordance with the invention and in response to a typical program instruction requiring a determination as to whether or not a transfer should be accomplished. Both the no-transfer and the transfer alternatives are illustrated in FIG. 7 to show that in one cycle of processor operation the full transfer instruction can be executed by the circuits of the present invention. The program cycle is advantageously divided into three phases of operation which are further advantageously divided into a total of 28 one-quarter microsecond intervals.

For the purpose of discussing the diagram in FIG. 7, assume a typical conditional transfer instruction such as one requiring a transfer upon the occurrence of a specified condition of a particular bit of a specified general purpose register. Such an instruction typically takes the form:

TXBU ALPHA,YA,F4

This instruction calls for a transfer to a memory address named ALPHA as indexed by the contents of the Y register 45 if the bit in bit position 4 of the X register 43 is not ZERO, i.e., unzero as indicated by the "U" in the instruction. The instruction further requires that if a transfer is executed the contents of the Y register 45 should be incremented after indexing, and the return address of the main program should be stored in the F register 44. This instruction can be coded in up to 40 bits for the embodiment illustrated in FIG. 1.

Consider first the no-transfer condition illustrated in FIG. 7. The PRAD signal from flip-flop 89 in FIG. 6 is present at all times to enable gate 91 in FIG. 1 since no transfer will be required and TRF flip-flop 89 in FIG. 6 will not be set. This signal does not affect memory 10 during all that time because a control signal ADRSB is required from control circuit 26 to actuate the memory access circuits 11 for addressing memory 10, and that control signal is not immediately provided. During the entire phase 1 of the cycle, the gate signals MRLG, WMLG', and XRRUB are provided to hold gate 37 open and to gate the output of the general purpose X register to the unmasked bus. Control signals from control circuit 26 operate shift circuit 32 in the shift-4 mode to move bit 4 in the contents of the X register to the zero bit position for testing as described for FIG. 6. The WMLG' signal indicates that the WMLG signal is absent so that shift stage 67 is disabled, and wired mask 33 is thereby decoupled from logic operations circuit 36. In addition, during phase 1, the index in the Y register is coupled to argument bus 49 as indicated by the YRAB signal. Note that the general purpose registers can serve either as index registers or as accumulation registers, depending upon the nature of the information stored therein at any particular time. The CCLG control signal is also provided during phase 1 to cause selection gate 51 of FIG. 1 to take the output of the one-bit rotate circuit 50 with inversion but no rotation as is required to accomplish the necessary indexing operation with the contents of the Y register by subtraction of a complement in logic operations circuit 36. Thus, during phase 1 the processor utilizes the invention for simultaneously indexing the transfer address and testing data.

By the end of the fourth time slot in FIG. 7 flip-flop 89 would have been reset if a transfer were to take place. Since the PRAD signal stayed up, no transfer will occur and the processor acts to resume its regular sequential operation. During time interval 4T6, i.e., the interval between the ends of fourth and sixth time slots of FIG. 7, the control signal DRPR couples the output of delay register 41 to the input of program address register 48 thereby placing in the latter register the incremented program address which had been produced automatically in the last phase of the instruction preceding the transfer instruction now being considered. Subsequently, during time 6T10 gate 38, which is normally enabled by LGMB, is disabled, as indicated by the complement signal LGMB' in FIG. 7. This clears the indexed address signals from the masked bus 39 to free it for other operations. Subsequently, during time 7T9 the control signal ADRSB appears during phase 1 to actuate memory access circuits 11. At this time the only address information available to those circuits is that which is coupled from address register 48 through gate 91. Accordingly, memory 10 is addressed with the new program address from register 48 and the transfer address is disregarded.

During phase 2 of the no-transfer operation there is no change in the control signals. During phase 3, however, the processor is prepared for the execution of its next instruction. The control signals SMA, PRUB and CCLG are provided all during phase 3 for coupling read-out from memory 10 to memory access register 21, for coupling program address register 48 to unmasked bus 30, and for actuating selection gate 51. During the interval 20T22 the REMA signal resets memory access register 21 to clear that register. This resetting operation does not destroy the information being supplied from memory 10 because it is being supplied on a single-rail logic basis to circuits operating on a double-rail basis; and the register must, therefore, be reset before a meaningful registration of the new information can take place. After the end of the REMA signal such read-out information from memory 10 sets the register 21 to its new state. During time 24T25 the REIR signal resets instruction register 22 to clear that register in like manner, and thereafter the MLIR signal couples the output of the left half of register 21 into instruction register 22 to make the new instruction coding available to control circuit 26.

The contents of program address register 48 are incremented in logic circuit 36 in response to the PRUB and CCLG signals in phase 3, and the incremented address appears on masked bus 39. During the interval 25T27 the signal MBDR couples the masked bus to the delay register 41 so that the incremented program address generated during phase 3 will be stored in register 41 to be available for addressing memory 10 during phase 1 of the next cycle.

Consider now the portion of FIG. 7 relating to the same transfer instruction but illustrating the condition under which a transfer is to be executed. In this case the PRAD signal persists in phase 1 during only the time OT4. At that time the flip-flop 89 in FIG. 6 is set as previously described to indicate that a transfer is to take place. Thus, the PRAD signal is removed and is replaced by the MBAD signal which persists during the balance of phase 1 to couple the indexed transfer address through gate 90 to access circuits 11. The other signals during the phase 1 which produce that indexed address and which provide test information to decision logic 56, appear the same as during the no-transfer condition just described. However, in the transfer situation during time 4T6 while the delay register output is being coupled to the input of the program address register, a signal DRFR also couples the same output to the input of the F register 44. This operation places the incremented program address which had been generated by a previous instruction into the F register where it is held as a return address for use at the end of the subroutine which is initiated by addressing the memory with the indexed transfer address. During the interval 7T9 in phase 1 the signal MBDR couples the indexed transfer address into the delay register and subsequently during phase 2 that same address is transferred into the program address register by the DRPR signal.

The termination of the MBAD signal at the end of phase 1 in the transfer case is caused by the resetting of flip-flop 89 in FIG. 6. The PRAD signal is available at that time at gate 85, but in the illustrative embodiment it was advantageously suppressed with respect to gate 91 during phase 2 by other sequencing and decoding functions for purposes relevant to system operations comprising no part of the present invention.

In phase 2 the contents of the Y index register are coupled to the unmasked bus by the signal YRUB and from that bus to logic circuits 36 as a first argument to increment the index represented thereby. At the same time the CCLG signal actuates selection gate 51 to couple a wired complement of unity signal to circuits 36 as the second argument for the incrementing operation. At time 16T18 in phase 2 the signal MBDR couples the masked bus to the delay register to cause the incremented contents of the Y index register to be stored in the delay register.

The operation during phase 3 in the situation where the transfer occurs is essentially the same as during the no-transfer case as can be seen in FIG. 5. The single exception is the activation during interval 22T24 of the control signal DRYR which moves the incremented index from the delay register into the Y index register to be available for the performance of further similar transfer instructions as may be required.

Although the present invention has been described with respect to a particular illustrative embodiment thereof, it is to be understood that additional modifications and embodiments which will be obvious to those skilled in the art are included within the spirit and scope of the invention.

What is claimed is:

1. A data processing system comprising a plurality of registers for storing data,
   - a memory storing data and a predetermined program of instructions for controlling said system, one of said instructions being a conditional transfer instruction which includes a predetermined transfer criterion, a transfer address, and the names of first and second ones of said registers containing data for indexing and data for testing, respectively,
   - a memory access register,
   - means fetching said conditional transfer instruction to said memory access register,
   - means indexing said transfer address with the contents of said first register,
   - means operative simultaneously with said indexing means testing the contents of said second register to produce output signals that are indicative of the condition of predetermined characteristics of such contents, and
   - means comparing said criterion and said output signals.

2. The data processing system in accordance with claim 1 in which
   - said transfer instruction includes coding identifying a single binary coded bit in the signal contents of said second register for comparison with said criterion,
   - said testing means comprises a one-bit test circuit for indicating the binary ONE or ZERO condition of an information bit, and
   - a shift circuit cooperates with said testing means and is responsive to said bit identifying coding for coupling said single bit specified by said instruction to said one-bit test circuit.

3. The data processing system in accordance with claim 2 in which
   - means couple said one-bit test circuit to a predetermined bit position output of said shift circuit, and
   - said shift circuit is a combinational logic type of circuit which shifts said bit specified in said coding from its original bit position in said second register to said predetermined bit position in a single operation while simultaneously coupling a signal representing such bit from said second register to said one-bit test circuit.

4. The data processing system in accordance with claim 1 in which said system includes
   - a program address register containing an address in said memory of one of said instructions, and
   - means responsive to a first or a second output of said comparing means selectively coupling to said memory either the output of said indexing means or the output of said program address register, respectively.

5. In combination,
   - signal storing means,
   - plural signal registration means,
   - means testing the contents of a first one of said registration means for a predetermined characteristic of any signals therein,
   - means, simultaneously operable with said testing means, indexing signals from said storing means with signals in a second one of said registration means, and
   - first and second circuit means which are independent of one another coupling the outputs of said first and second registration means to said testing means and said indexing means, respectively.

6. The combination in accordance with claim 5 in which
   - said testing means, indexing means, and first and second circuit means are all combinational logic means,
   - means are provided for simultaneously actuating said combinational logic means, and means responsive to a predetermined output from said testing means couple an output of said indexing means to said storing means.

7. In a data processing system, memory means for storing data for use in processing and a program of instructions for controlling said system, a memory access register, a plurality of general purpose registers for temporary storage of signal information during processing, a tandem signal operations circuit including in tandem a combinational logic shift circuit and a logic operations circuit, both controllable by said instructions, means cooperatively coupling said registers, said access register, and said tandem operations circuit together for data processing, said coupling means comprising first means coupling said access register through said tandem circuit to the inputs of any selectable one or more of said registers and second means coupling the output of any selectable one of said registers through said tandem circuit to said access register, means responsive to a predetermined one of said instructions decoupling said shift circuit and said logic operations circuit from one another for a predetermined time interval, testing circuits coupled to said shift circuit, and means further responsive during said interval to said predetermined instruction simultaneously and independently coupling the output of any one of said registers through a portion of said second coupling means and said shift circuit to said testing circuits, and coupling an output of said access register through said logic operations circuit to a portion of said first coupling means.

References Cited

UNITED STATES PATENTS

| | | | |
|---|---|---|---|
| 3,292,155 | 12/1966 | Neilson | 340—172.5 |
| 3,239,820 | 3/1966 | Logan et al. | 340—172.5 |
| 3,234,519 | 2/1966 | Scholten | 340—172.5 |
| 3,161,856 | 12/1964 | Propster et al. | 340—172.5 |
| 3,161,855 | 12/1964 | Propster et al. | 340—172.5 |

OTHER REFERENCES

"One Cycle Conditional Transfer," IBM Technical Disclosure Bulletin, vol. 3, No. 10, March 1961, pages 45, 46, by P. M. Gannon.

"Method for Generating Masking Functions," IBM Technical Disclosure Bulletin, vol. 5, No. 7, December 1962, pages 84, 85, by W. E. Burns, Q. E. Correll and G. F. Nielsen.

ROBERT C. BAILEY, *Primary Examiner.*

GARETH D. SHAW, *Examiner.*